United States Patent [19]

Gittins et al.

[11] Patent Number: 5,526,350
[45] Date of Patent: Jun. 11, 1996

[54] COMMUNICATION NETWORK WITH BANDWIDTH MANAGERS FOR ALLOCATING BANDWIDTH TO DIFFERENT TYPES OF TRAFFIC

[75] Inventors: Christopher J. Gittins, Felixstowe; Simon A. Cox, Woodbridge, both of England

[73] Assignee: British Telecommunications public limited company, London, England

[21] Appl. No.: 263,350

[22] Filed: Jun. 21, 1994

[30]  Foreign Application Priority Data

Mar. 9, 1994 [EP] European Pat. Off. ............. 94301675

[51] Int. Cl.⁶ .......................... H04Q 3/00; H04L 12/00; H04J 3/00
[52] U.S. Cl. .................... 370/58.100; 370/112; 370/118; 358/425; 358/426
[58] Field of Search .............................. 370/53, 57, 58.1, 370/60, 62, 60.1, 68.9, 79, 112, 118; 379/93, 96; 348/14, 15, 16; 358/425, 426, 434, 435

[56]  References Cited

U.S. PATENT DOCUMENTS

| | | | |
|---|---|---|---|
| 4,533,943 | 8/1985 | Poitier | 358/85 |
| 4,763,317 | 8/1988 | Lehman et al. | 370/58.1 |
| 4,768,188 | 8/1988 | Barnhart et al. | 370/80 |
| 4,823,342 | 4/1989 | Morita et al. | 370/109 |
| 5,239,542 | 8/1993 | Breidenstein et al. | 370/79 |
| 5,278,972 | 2/1994 | Baker et al. | 395/500 |
| 5,297,147 | 3/1994 | Shimakasa | 370/118 |
| 5,329,526 | 7/1994 | Murata et al. | 370/60 |
| 5,339,356 | 8/1994 | Ishii | 379/234 |
| 5,367,522 | 11/1994 | Otani | 370/84 |
| 5,373,316 | 12/1994 | Ishinabe et al. | 379/96 |

FOREIGN PATENT DOCUMENTS

| | | |
|---|---|---|
| 0495128A1 | 7/1992 | European Pat. Off. . |
| 0530443A2 | 3/1993 | European Pat. Off. . |
| 3808413 | 3/1988 | Germany . |
| 01152894 | 9/1989 | Japan . |
| 02298132 | 2/1991 | Japan . |
| 03181263 | 8/1991 | Japan . |
| WO92/21189 | 11/1992 | WIPO . |

OTHER PUBLICATIONS

Wilson et al, "A Network Control Architecture for Brandwidth Management", Supercomm/ICC '92 Session 347, paper 2, vol. 3, 14 Jun. 1992, Chicago US, pp. 1385–1391, XP337937.

Cheng, "Virtual Fiber Networking", IEEE International Conference on Communications, Session 25, Paper 2, vol. 2, 23 Jun. 1985, Chicago US, pp. 795–798.

Matt et al, "Integrated Broad–Band Communication Using Optical Networks—Results of an Experimental Study", IEEE Transactions on Communication Technology, vol. COM–29, No. 6, Jun. 1981, New York US, pp. 868–885.

Andrich et al, "Concept and Realization of the Broadband ISDN", Electrical Communication, vol. 61, No. 1, 1987, Harlow GB, pp. 110–117.

Cotterill "DMCS: Achieving Interconnection and Compatibility between Mu– and A–Law Networks", IEEE International Conference on Communications '86, vol. 3, 22 Jun. 1986, Toronto CA, pp. 1701–1705.

(List continued on next page.)

*Primary Examiner*—Hassan Kizou
*Attorney, Agent, or Firm*—Nixon & Vanderhye

[57]  ABSTRACT

A switched telecommunications network includes a plurality of switches for switching different types of traffic, such as audio data, including voice data, fax and modem originated data, digital computer originated data and video data. A communications link connects a user's site to the network, and bandwidth manager are provided to multiplex traffic of different types for transmission over the link. After transmission over the link, a complementary bandwidth manager is arranged to de-multiplex the traffic for application to the respective switches. The bandwidth manager is arranged to dynamically allocate bandwidth to the different types of traffic, thereby optimizing the available bandwidth provided by the communications link.

18 Claims, 6 Drawing Sheets

OTHER PUBLICATIONS

Electrical Communication, vol. 65, No. 1, 1991, Romford GB, pp. 32–37, "Corporate Networks" Litofsky et al, International Switched Digital Service, Tencon '89, Session 16, Paper 3, 22 Nov. 1989, Bombay, In. pp. 303–305.

Tokunaga et al, "Enhanced TDM–M3000 Series for 1–Interface Super–Digital", NTT Review, vol. 2, No. 4, Jul. 1990, Tokyo, JP, pp. 124–128.

Hossain et al, "Private Digitral Networks", IEEE Infocom '86, 8 Apr. 1986, Miami US, pp. 524–529.

COMMUNICATION NETWORK WITH BANDWIDTH MANAGERS FOR ALLOCATING BANDWIDTH TO DIFFERENT TYPES OF TRAFFIC

BACKGROUND OF THE INVENTION

1. Field of the Invention

The present invention relates to a switched telecommunications network, of the type including first switching means for switching a first type of traffic and second switching means for switching a second type of traffic. The invention also relates to a method of communicating over a network of this type, the method comprising steps of switching first and second types of traffic.

2. Related Art

Dedicated networks for the transmission of different types of data are known. For example, the public switched telephone network (PSTN) provides voice and data communications over well-established international channels. In addition, networks are becoming increasingly available which are capable of switching other types of traffic, such as computer originating data and video data. Local exchanges are provided for each of these types of data, and a user is provided with a dedicated local line, connecting the user's terminal equipment to said exchanges.

A problem with this approach is that, from the user's point of view, the bandwidth provision between the terminal equipment and the exchange equipment is significantly increased, given that bandwidth provision must be provided for each of the data services, i.e. voice, video and computer data. However, in existing equipment, it is necessary to provide links of this type, given that specialised switching devices are provided for each type of traffic.

SUMMARY OF THE INVENTION

The present invention provides a switched telecommunications network comprising a first switching means for switching a first type of traffic; a second switching means for switching a second type of traffic; a communications link connecting a user's site to the network; a bandwidth manager, at the user's end of the communications link, arranged to multiplex traffic of the first and second types for transmission over the link; and a complementary bandwidth manager, at the switching end of the link, arranged to de-multiplex the first and second traffic types for application to respective switching means.

An advantage of the present invention is that it allows a predetermined amount of bandwidth to be allocated to users which may be shared between particular types of traffic.

In a preferred embodiment, the bandwidth manager is arranged to allocate bandwidth to particular types of traffic in response to customer demand. However, particular types of traffic may be guaranteed minimum levels of bandwidth.

Types of traffic which may be conveyed with the network may include video data, computer originating data, voice data, audio modulated data or any combination of these traffic types. When audio data is being transmitted, means may be provided for identifying whether the audio data is voice data, data originating from a facsimile machine, or data originating from a modem. Preferably, audio data is compressed, and the level of compression is dependent upon the type of data being transmitted. Preferably, the highest level of compression is provided for voice data.

The invention also provides a method of communicating over a network, the method comprising the steps of switching a first type of traffic via a first switching means, switching a second type of traffic via a second switching means; connecting a user's site to the network via a communications link; multiplexing traffic of the first and second types for transmission over the link at the user's end of the link; and de-multiplexing the first and second traffic types for application to respective switching means at the switching end of the link.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS

Figure 1:
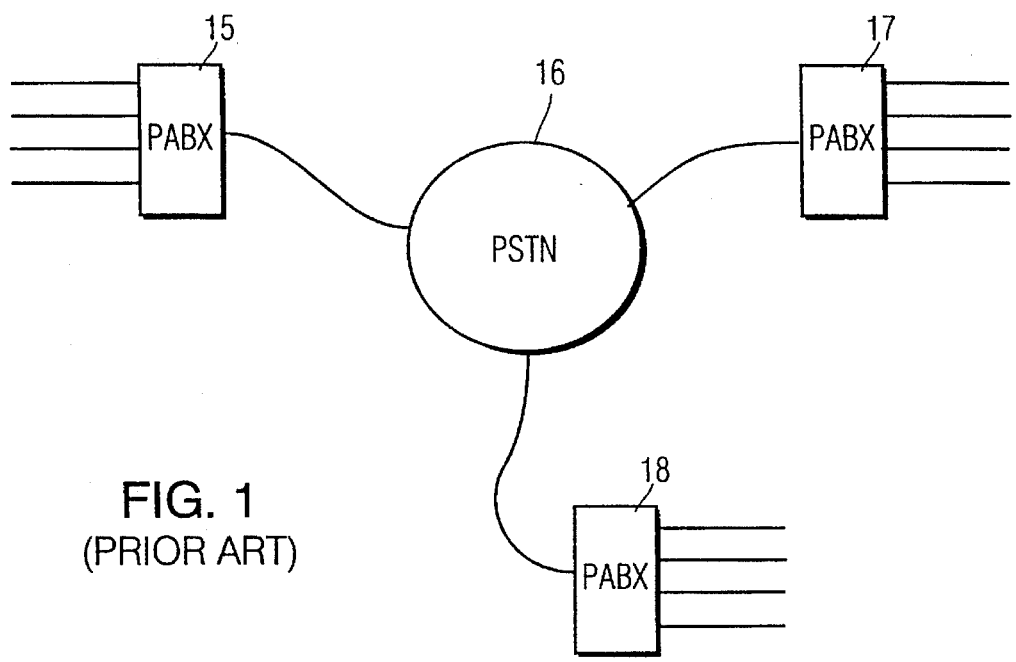
FIG. 1 shows a known arrangement having a plurality of private automatic branch exchanges (PABXs) connected to the PSTN.

Referring to the drawings, FIG. 1 shows a known arrangement in which a first PABX 15 is connected to the PSTN 16. The PSTN 16 represents the global telephone network, including local exchanges, trunk exchanges, intercontinental transmission cables and satellite links etc. A second PABX 17 and a third PABX 18 are also shown connected to the PSTN 16. For the purposes of this disclosure, it may be assumed that the three PABXs 15, 17 and 18 shown in FIG. 1 represent the telephone facilities provided at three geographically-displaced sites of a common organisation. Thus, for example, the PABX 15 may be in the United States, the PABX 17 may be in Europe, and the PABX 18 may be in Japan. However, given that they are all part of a common organisation, it may be assumed that personnel at each site will be in regular contact with personnel at the other two sites. Thus, the level of telecommunication traffic between the PABXs 15, 17 and 18 far exceeds that which would normally be expected from completely unrelated sites.

For the purposes of this disclosure, it may be assumed that each of the PABXs 15, 17 and 18 represents an example of a state of the art system, each providing a high degree of functionality for its respective site. However, as will readily be appreciated, given the constraints of the PSTN 16, most of this functionality is lost when communication takes place between two of the remote sites. Thus, if a majority of telephone conversations take place between sites, rather than between different locations at the same site, much of the functionality provided by the PABXs 15, 17 and 18 is effectively lost.

Figure 2:
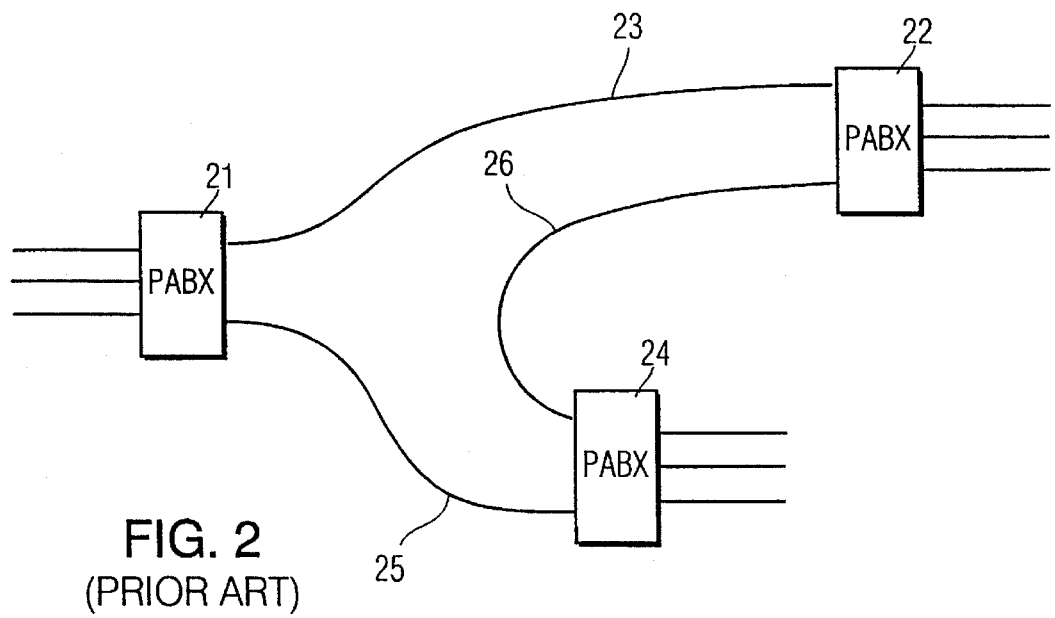
FIG. 2 shows a known arrangement having a plurality of PABXs connected via dedicated private lines.

An alternative known arrangement is shown in FIG. 2, which shows a first PABX 21 connected to a second PABX 22 via a dedicated telecommunications link 23. Similarly, the first PABX 21 is connected to a third PABX 24 via another dedicated communications link 25. Finally, the second PABX 22 is also connected to the third PABX 24 via another dedicated telecommunications link 26. Thus, in this example, communications taking place between the PABXs 21, 22 and 24 are not constrained by the limitations of the PSTN. Clearly, it should be appreciated that the PABXs 21, 22 and 24 will also have connections to the PSTN, allowing communications to be made outside the group. However, the dedicated links 23, 25 and 26 allow a far greater use of the facilities provided by the PABXs 21, 22 and 24, to be employed on an international scale.

A disadvantage of the system shown in FIG. 2 is that dedicated links of the type identified as 23, 25 and 26, are expensive, and could only be justified if a substantial amount of traffic was regularly being transmitted between the three sites. In the majority of applications, such a system topology cannot be justified, particularly if the links are not being used for other forms of communication, such as video communication and/or data communication etc.

Figure 3:
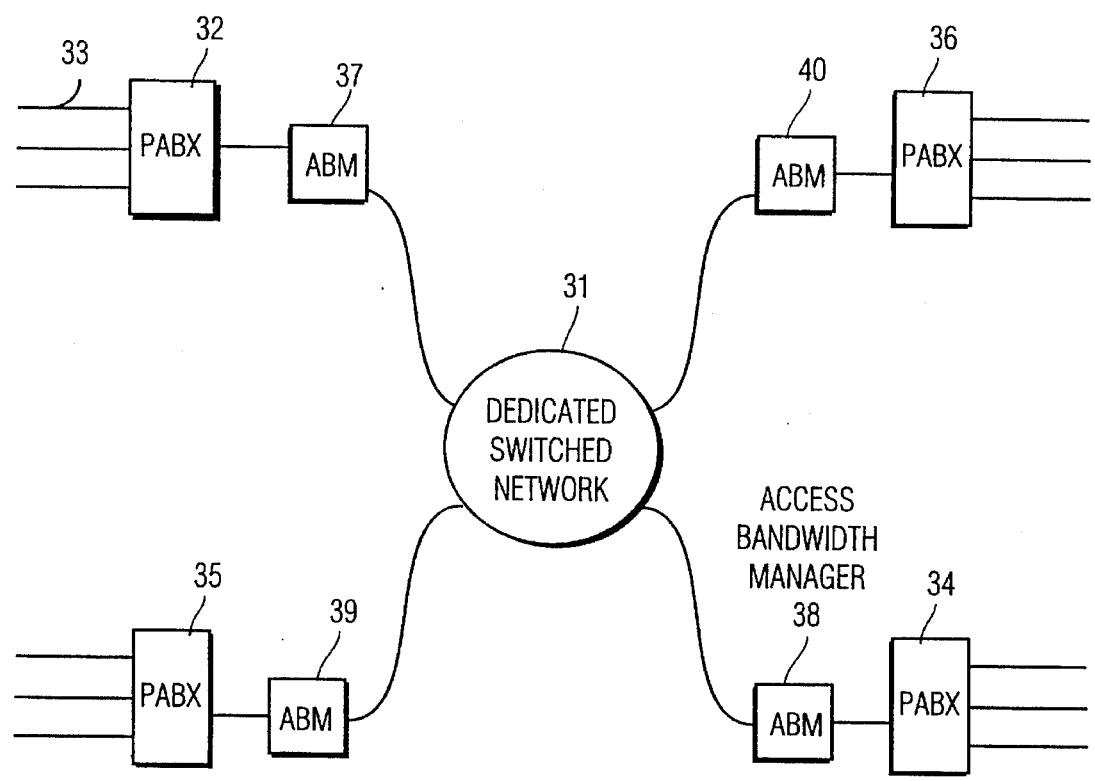
FIG. 3 shows an enhanced network in accordance with the present invention, in which PABXs are connected to a switched network via bandwidth managers arranged to process signals to ensure that PABX specific signals are converted to signals compatible with the switched network.

Referring to FIG. 3, a system embodying the invention includes a dedicated switched network 31 which, from a functional point of view, operates in a manner very similar to the PSTN 16. The dedicated switched network 31 is provided internationally, and is configured by leasing communications channels from established network providers. Thus, the dedicated switched network 31 does not provide inherent functionality to customers. Signals transmitted through the dedicated network 31 must be configured in a dedicated way. However, the network 31 is provided with sophisticated control systems, allowing service modifications to be made, particularly in terms of bandwidth and grade of service etc.

A first customer may have a first PABX 32 with a plurality of local lines 33 connected thereto. Customers using the PABX 32 may be in regular contact with customers using a second PABX 34; and, for the purposes of this disclosure, it may be assumed that the PABX 32 is at a location in the United States, and the PABX 34 is at a location in Japan. Both of the PABXs 32 and 34 are controlled by a common organisation, and so it is desirable, as far as that organisation is concerned, to make maximum use of the facilities provided by the PABXs 32 and 34. However, communications signals transferred between them are directed through the dedicated switched network 31, having transmission paths which must be shared with other customers.

An example of another customer is shown as a third PABX 35 which again is in regular communication with a fourth PABX 36. Thus, the PABX 35 and the PABX 36 may be of compatible types, such that signals generated by the PABX 35 would be recognisable by the PABX 36. Similarly, the PABX 32 may be of a similar type to the PABX 34 and again, signals may be transmitted between them which are mutually understood. It should also be appreciated that, given the PABX 32 belongs to a completely separate organisation to that owning the PABX 35, any communication provided by these two exchanges is of an "arms length" nature, and may be made using conventional PSTN techniques. Thus, there is no requirement for the PABX 32 to communicate with the PABX 35 through the dedicated switched network 31. However, as far as the switched network 31 is concerned, it is desirable to make maximum use of the available bandwidth so that common transmission paths within the network must be capable of conveying signals generated by any of the exchanges present in the system.

In order for conventional PABX systems to make use of the dedicated switched network 31, the network provides, for each PABX 32, 34, 35 and 36, a respective access bandwidth manager (ABM). Thus, communications between the PABX 32 and the dedicated switched network 31 are made via a first ABM 37. Similarly, a second ABM 38 is provided for the PABX 34, a third ABM 39 is provided for the PABX 35, and a fourth ABM 40 is provided for the PABX 36.

The ABMs 37 to 40 are provided by the overall service provider, providing access to the dedicated switched network 31. From a customer's point of view, conventional PABX equipment is connectable to the network 31, providing facilities similar to those available by the provision of a dedicated link, as illustrated in FIG. 2, while at the same time allowing cost savings to be made, as provided by a switched network, of the type shown in FIG. 1. Thus, a respective ABM 37 to 40 is provided, by the network supplier, for each PABX 32, 34, 35 and 36, each ABM being, arranged to process signals so that PABX specific signals are converted to signals compatible with the switched network 31. Similarly, converted signals received from the switched network 31 are re-converted to signals processable by the receiving PABX 32, 34, 35 or 36.

Within many large organisations, communications networks are becoming a more and more important part of the infrastructure. In addition to standard voice transmission, networks are also required to carry video information and computer based data. Thus, within a particular local site, individual telephone handsets and fax machines may be coordinated through PABXs and computers may be connected together via a local area network (LAN).

Many large organisations consist of a plurality of sites distributed over a wide national area and, often, distributed globally. Thus, for example, a large organisation may have major centres in several continents around the world. In order to enhance the efficiency of these sites, it is advantageous for the local communication networks to be connected together in some way, thereby facilitating the transmission of telephone conversations, video conferences and computer originating data transfers. Such networks improve communications between sites and reduce the number of occasions when the physical transportation of personnel is required.

Figure 4:
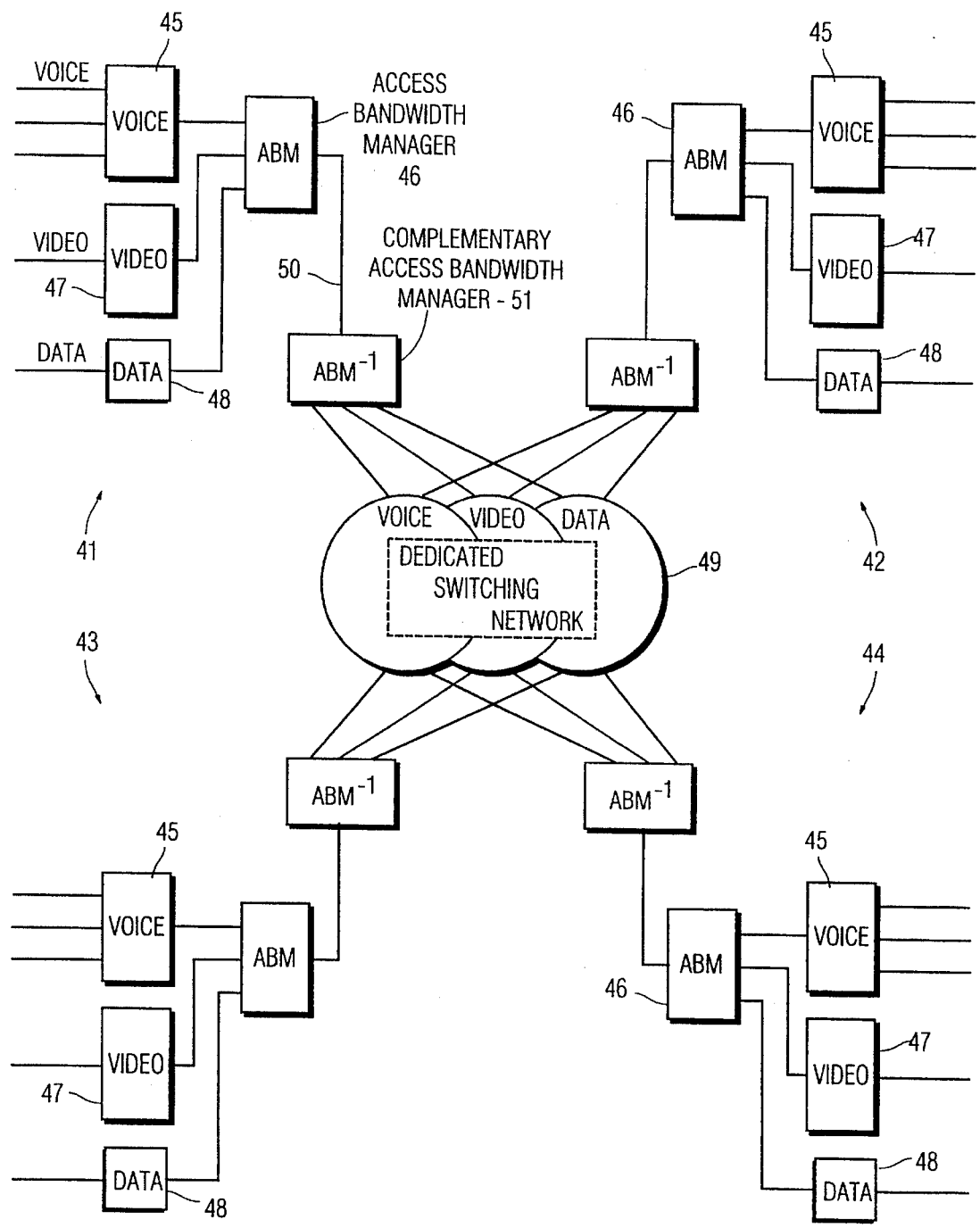
FIG. 4 shows an enhanced network including bandwidth managing devices in which, in addition to voice signals, video signals and data signals are transmitted by the network.

An enhanced version of the network illustrated in FIG. 3 is shown in FIG. 4. Again, there are four sites (identified as 41, 42, 43 and 44) connected to a dedicated switching network 49, and it should be appreciated that these sites may be positioned at different geographical locations around the world. It should also be appreciated that the system is not limited in terms of the number of sites which may be connected to the network. However, it should be appreciated that the network is configured so that predetermined sets of sites are mutually connectable, thereby providing the functionality of independent leased lines but within a shared switched environment. It should also be appreciated that the actual provision of services at particular sites may vary from one to another, depending upon the requirements of these sites. Thus, a Head Office may make many calls to its other associated sites, although the number of calls made between the associated sites may be significantly less. Thus, under such circumstances, it would be desirable for the Head Office site to be provided with significantly more bandwidth than each of its associated sites.

The site 41 is typical of the site illustrated in FIG. 4, and includes a PABX 45 which is similar to the PABX 32 shown in FIG. 3. Thus, the PABX 45 is arranged to supply voice signals to an ABM 46. In addition, video facilities are also present at the site 41, and a video processing device 47 is also arranged to communicate with the ABM 46. Furthermore, the site 41 is provided with a data processing device 48 which is arranged to communicate with the ABM 46, allowing communication of data between the site 41 and other associated sites connected to the network.

The dedicated switching network 49 is arranged for the independent switching of voice signals, video signals and data signals. Furthermore, the network 49 may be considered as three independent, overlaid, logical networks; although, at various stages within the network, physical transmission paths may transmit more than one type of signal, thereby making it part of more than one of the logically overlaid transmission networks. However, from a user's point of view, the network 49 provides ports for the transmission of voice signals, video signals and data signals.

At the ABM 46, voice signals from the PABX 45 are multiplexed with video signals from the video processing device 47, and with data signals from the data processing device 48. These multiplexed signals are then transmitted over a common transmission path 50 to a complementary ABM 51. At the complementary ABM 51, the voice, video and data signals are separated, thereby allowing these signals to be supplied to respective ports of the dedicated network 49.

It is envisaged that the overall system, consisting of the ABMs 46, complementary ABMs 51, and the network 49 would be managed by a central service provider (not shown). The control, management and financing of the network could be provided from one particular country, and the distributed devices constituting the network would be controlled from this central location. The network provider would be in a position to provide a global telecommunications service, configured from physical transmission paths leased from local providers, but with logical communication channels controlled by a central management function.

The network could be managed by a network provider resident in the United Kingdom, while providing services to sites, such as the sites 41, 42, 43, and 44 shown in FIG. 4, in globally-distributed locations by making use of telecommunications links supplied by local network providers in the territories concerned. Thus, for example, the site 41 could be located in New York and access points to the network 49 could be provided in Washington. The associated ABM 46 would be located close to the customer's equipment in New York; and, similarly, the complementary ABM 51 would be located close to the entry ports in Washington; each of the ABMs 46 and 51 being supplied by the network provider resident in the United Kingdom. However, the communications link 50 connecting the ABM 46 to the complementary ABM 51 would be provided by a local network provider resident in the United States. This local organisation would supply the global provider with a specified bandwidth provision, enabling a specified level of traffic to be communicated between the ABMs 46 and 51.

The communications link 50 would generally provide very little in the way of functionality, and data would need to be transmitted in accordance with national transmission standards, thereby making the link 50 compatible with the communications channels provided by the local network provider. The ABM 46 is, therefore, configured to interpret data generated by the PABX 45, data generated by the video processing device 47, and data generated by the data processing device 48.

In addition to multiplexing this data for transmission over the link 50, the data must also be converted into a form suitable for transmission over the link 50. Furthermore, the ABM 46 must be capable of generating signalling information, transmittable over the link 50, which may then be interpreted by other devices within the network. Similarly, signalling information generated by the customer equipment (45, 47, 48) must also be converted into a form suitable for transmission within the rest of the network, while allowing it to be recovered at the receiving site. Thus, from a receiving point of view, an ABM, such as the ABM 46, is arranged to receive data transmitted over a channel, such as the link 50, and regenerate customer generated signalling data in such a way that the data will be received by customer equipment in a form similar to that in which it would be received had it been transmitted over a dedicated link configured completely in accordance with the customer's requirements.

From the point of view of the overall network provider, the leasing of communications channels from local network providers is expensive, and costs to customers can only be reduced if maximum benefit is derived from these leased circuits. In the present system, three techniques are employed in order to maximise the efficiency of leasing circuits from other network providers. These techniques may be summarised under the headings of concentration, compression and bandwidth optimisation.

A first level of concentration is provided by the ABMs, such as the ABM 46, which facilitates the concentration of voice, video and data onto the common transmission link 50. Thus, it can be appreciated that the ABM 46 is arranged to receive different types of data from customer equipment, to multiplex these different types of signals and to transmit the multiplexed signals to the complementary ABM 51. At the complementary ABM 51 de-multiplexing is performed, whereafter the different types of transmitted data are supplied to respective circuits within the network 49.

Thus, it should be appreciated that the communications link 50 is not rigidly divided so as to provide a predetermined amount of bandwidth for voice communications, and a further predetermined amount of bandwidth for video communications, with the remainder being dedicated to data communications. The allocation of bandwidth for these three types of communications is adjusted in accordance with customer demand. For example, when a customer does not require video data to be transmitted over the network, bandwidth is released for voice communications. Also, video communications could be reserved for periods when voice traffic is relatively low, during particular times of the day. Furthermore, voice data or other types of data, originating from different sources supplied, for example, to the PABX 45 may be given different grades of service by the ABM 46. Some priority lines may always be given access to the communications link 50, whereas others may only be given access when bandwidth is available. Furthermore, the ABM 46 may be configured so as to generate suitable messages which are returned to the PABX 45 when access to the communications link 50 is denied, thereby providing congestion management.

In addition to providing concentration over links between ABMs 46 and their complementary ABMs 51, further concentration may be provided within the network 49, examples of which are described below.

Significant savings, in terms of bandwidth usage, are made by providing data compression. Systems are known in which standard digitised voice channels may be compressed by a factor of eight or more. Digitised voice signals are often transmitted at a rate of 64 kbit/s and, using known compression techniques, this may be reduced to 8 kbit/s, or less, with minimal signal degradation. Thus, at receivers, the compressed voice signals may be de-compressed, thereby presenting a standard format 64 kbit/s voice channel to the receiving customer's terminal equipment.

Voice channels made available by a PABX, such as the PABX 45, are also used for transmitting other types of data, such as that generated by facsimile machines and by modems. The ABMs 46 may be provided with equipment for identifying this type of data and, where appropriate, performing demodulating operations as part of a procedure to transmit the data in a more efficient way. Data supplied to the data processing device 48, possibly derived from a LAN, may also be compressed by the ABM 46. However, video data will tend to have been compressed by the customer's equipment, and so this type of data will tend to be transmitted without attempting further compression at the ABM 46.

Although modern compression techniques are capable of introducing very low levels of information loss, levels of information loss will tend to increase if compression and decompression are effected many times during transmission through a network. This often occurs because a network may consist of standard switching elements which are not capable of switching data in compressed form.

In the system shown in FIG. 4, the network 49 is configured from standard switching elements. Thus, voice networks use standard 64 kbit/s voice switching networks. However, the network 49 is capable of transmitting compressed voice data, without implementing de-compression and recompression each time the data is switched Thus, customers should not be aware that compression is taking place, given that an originating voice signal will be compressed at a transmitting ABM 46 and only de-compressed, to a full bandwidth voice signal, when the signal has been received at its destination ABM. Thus, at each stage in the network where it is necessary to lease transmission bandwidth from other network suppliers, voice signals may be transmitted in fully compressed form, while maintaining compatibility with the local transmission environment, by means of suitable bandwidth management devices.

The third technique identified above is that of efficient bandwidth management. Efficient bandwidth management refers not to operational characteristics but to the selection of bandwidth requirements during the installation of a system. Once the level of service required by a customer has been established, the global network provider must determine the bandwidth provision for particular communication links. Thus, a customer at the site 41 can be guaranteed a particular bandwidth provision and a particular grade of service, based on an estimate of system usage and overall traffic requirement. The global system provider must thereafter provide a fixed degree of bandwidth over the dedicated link 50. However, in the majority of situations, it is highly unlikely that the degree of communication traffic will remain constant over a twenty four hour period. It is much more likely that, at a particular time of the day, the traffic demand will peak significantly above a mean level.

In order to optimise the selection of bandwidth provided by the link 50, the ABM 46 may also have access to other means of communication with the network 49. Thus, for example, the ABM 46 may be provided with means for accessing other available PSTN and ISDN services when the provision of service over the link 50 has reached its capacity. Clearly, the use of these other services will tend to be significantly more expensive than the use of the dedicated link 50. However, on balance, it will tend to be more economical to make occasional use of the PSTN, particularly at peak periods, rather than providing a degree of bandwidth over the dedicated link 50 which is capable of carrying the peak level of traffic.

Figure 5:
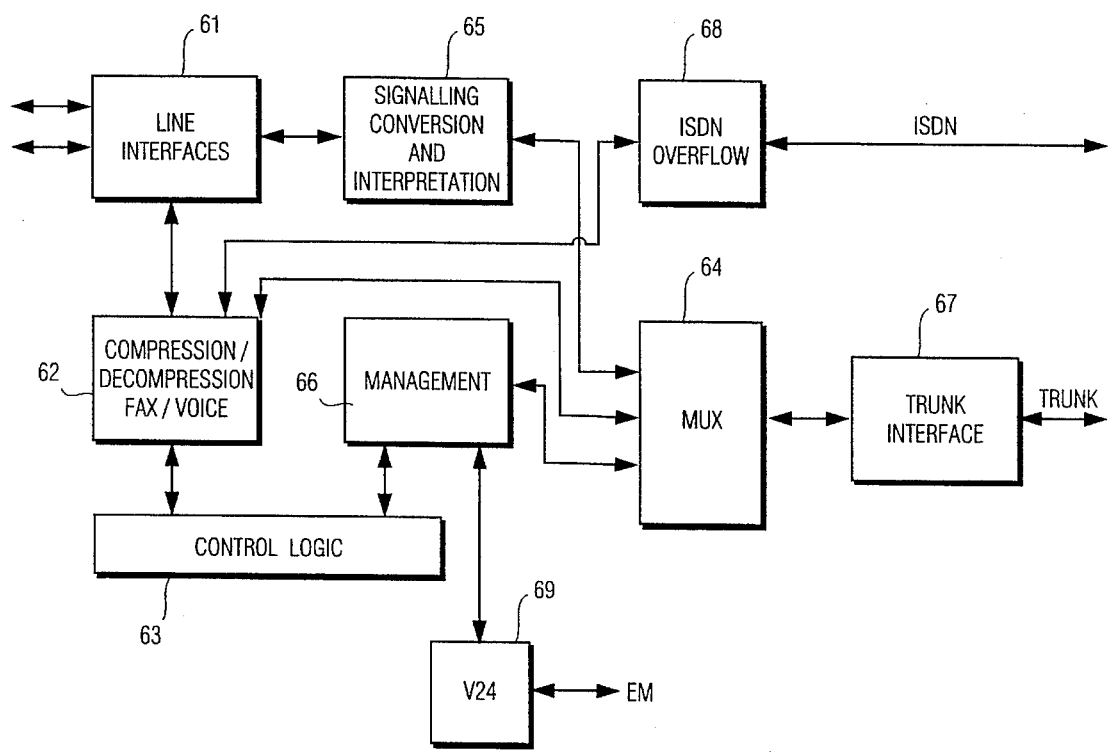
FIG. 5 shows a bandwidth managing device of the type identified in FIG. 4.

An ABM, such as the ABM 46, is shown in more detail in FIG. 5. A line interface circuit 61 interfaces the ABM 46 to the customer terminal 44 (not shown in FIG. 5). The number of interface circuits provided is dependent upon customer requirements, including those compatible with analog loop calling, earth calling, AC15, DCS, DC10, along with 2.048 Mbit/s and 1.55 Mbit/s inputs.

Voice transmissions and facsimile transmissions are compressed, so this type of data is supplied to a compression circuit 62. Firstly, the compression circuit 62 analyses the type of data being received, and supplies the results of this analysis to control logic 63. The control logic 63 determines the type of compression required and, in turn, controls the second part of the compression circuit 62, which actually performs the compression.

The compressed data is supplied to a multiplexer 64, which is also arranged to receive signalling information from a signalling conversion circuit 65. The signalling conversion circuit 65 is arranged to receive signalling information from customer equipment, via the line interface circuit 61, and to convert this into a common standard form of signalling, used throughout the network.

A management circuit 66 is also arranged to supply information to the multiplexer 64. At the multiplexer 64, all of this information is multiplexed for transmission to the link 50, via a trunk interface circuit 67.

In a majority of applications, the capabilities of the link 50 will be less than the maximum demand placed on the system. When maximum demand does occur, additional provision is provided by a dial-up service, in the form of an ISDN overflow circuit 68. Thus, once the trunk interface circuit 67 reaches capacity, additional compressed data may be supplied over the public dial up system.

The management circuit 66 is also arranged to contact the central management system via a V24 data interface and associated modem 69, or via other suitable communication means.

Referring to FIG. 5, it can be appreciated that the overall network, made accessible to customers, consists of the ABMs 46, the communications links 50, the complementary ABMs 51 and the dedicated switching network 49. The global network provider leases elements of the network from national network providers, including the communications link 50 shown in FIG. 4. It will also be appreciated that the functionality provided by the ABMs ensures that the global network provider obtains maximum benefit from the leased circuits, such as the communications link 50.

This philosophy of providing bandwidth managers, in order effectively to overlay an international communications network over existing communication paths, may be extended to the communication links provided within the dedicated switching network 49.

Figure 6:
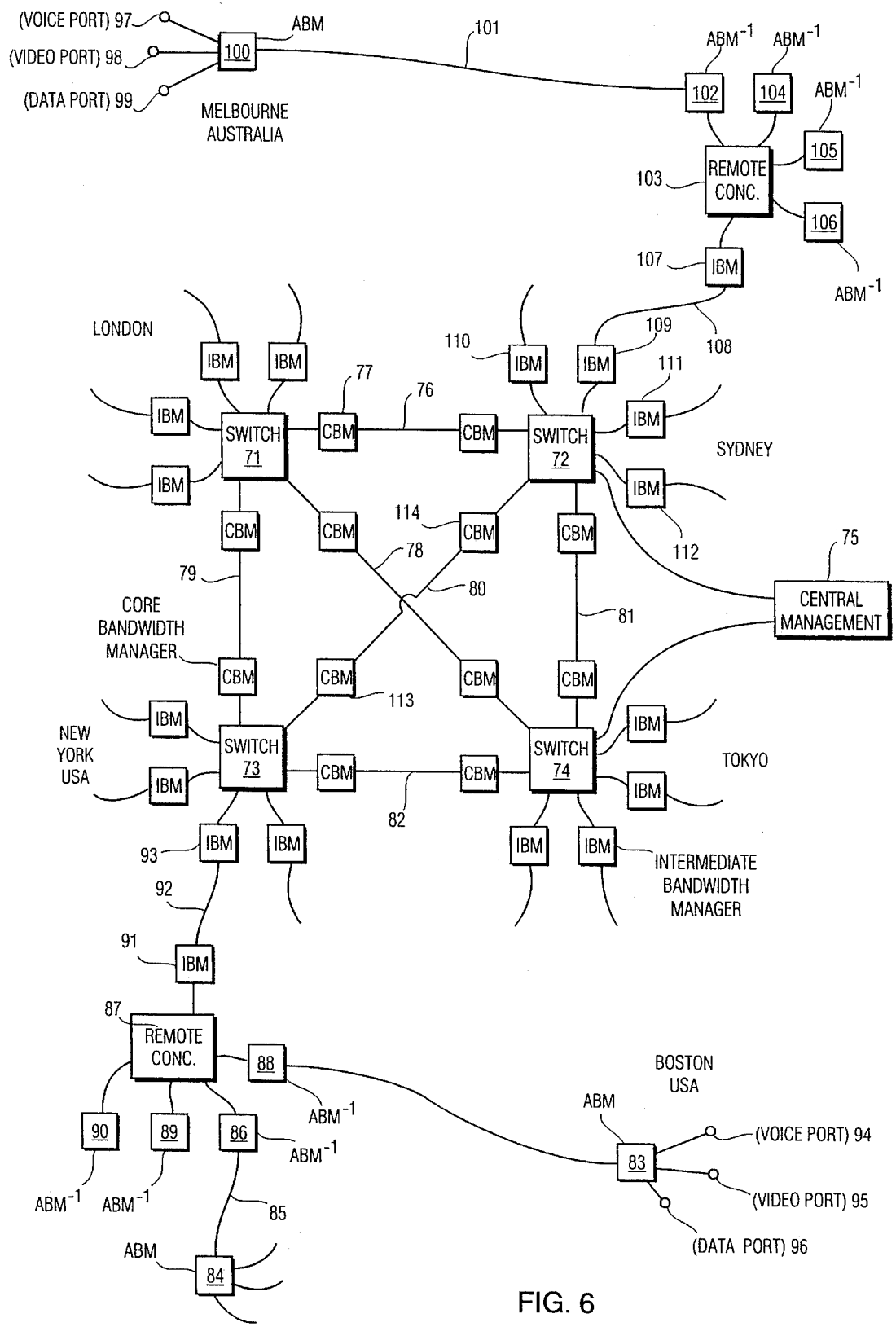
FIG. 6 illustrates a complete network, providing international communication of multiple data types and signal switching in compressed form.

An example of the dedicated switching network 49 is shown in FIG. 6, in which a first service switch 71 is located in London, a second service switch 72 is located in Sydney, a third service switch 73 is located in New York and a fourth service switch is located in Tokyo. Each of the service switches 71 to 74 includes dedicated equipment provided by the global network provider and is capable of switching standard 64 kbit/s digitised speech channels. Thus, it should be appreciated that the network illustrated in FIG. 6 represents a speech network, and similar networks may be provided for video and data etc.

Each service switch 71 to 74 is connected to a central management computer 75 via a suitable communications channel. Thus, the operation of the service switches 71 to 74 may be modified under the control of the central management computer 75 on a call-by-call basis.

The network has service switches located globally, which switches provide the core of the international network and may therefore be referred to as the core service switches. The core service switches 71 to 74 are mutually connected via core trunk transmission lines, which would generally be provided by existing international transmission circuits, such as underwater cables or satellite links. Thus, transmission between the core service switches is facilitated by the global service provider leasing a predetermined amount of bandwidth capability from existing network suppliers. Thus, core service switch 71 communicates with the core service switch 72 over an international communications link 76 which, as previously stated, may include underwater cables or satellite links, the former being preferred so as to minimise transmission delays.

The leasing of international communications links is a similar process to the leasing of national links, such as link 50 shown in FIG. 4. In order to maximise the efficiency of the bandwidth provision made by these links, similar techniques may be employed in the form of core bandwidth managers (CBMs) 77. Thus, by the provision of bandwidth managers between core communication links, an interface is made available which allows core switches, operating at full bandwidth, to communicate over a compressed and multiplexed international communications link 76, thereby maximising the efficiency of that link, while at the same time maximising the efficiency of the core switching environment 71/72.

Similarly the core switch 71 communicates with the core switch 74 over an international link 78, and communicates with the switch 73 over an international link 79. The core switch 72 communicates with the core switch 73 over an international link 80, and with the core switch 74 over an international link 81. Finally, the core switch 73 communicates with the core switch 74 over an international link 82.

Each international link 76, 78, 79, 80, 81, 82, provided by leasing existing bandwidth capability, is terminated by CBMs at either end, providing interfaces to the core switches 71 to 74. Each core switch 71 to 74 is arranged to switch signals to other core switches, or to switch signals out of the core network.

The network associated with the core switch 73 is terminated by ABMs 83 and 84. Customer terminal equipment is connected to the ABM 84, which may consist of a PABX for voice signals, along with devices for video signals and data signals. A leased line 85 provides access to a complementary ABM 86 which, as previously stated, de-multiplexes voice, video and data signals for transmission over respective networks.

The voice network associated with the core switch 73 includes a remote concentrator 87 which also communicates with complementary ABMs 88, 89 and 90. (Similar remote concentrators would be provided nationally, each being connected to the associated national core switch 71 to 74). Again, it is necessary to provide a communications link between the remote concentrator 87 and the core switch 73, which link takes the form of a leased communications link 92. The bandwidth provided by the leased communications link 92 is again optimised by the use of intermediate bandwidth managers (IBMs). Thus, concentrated signals from the remote concentrator 87 are supplied to a first IBM 91 for transmission over the communications link 92. At the site of the core switch 73, signals received over the communications link 92 are supplied to a second IBM 93, arranged to interface the communications link 92 with the core switch 73.

The CBMs 77 and the IBMs 91 and 93 are substantially similar in design to the ABMs 46, 83 and 84, as described with reference to FIG. 5. In particular, it should be possible to fabricate bandwidth managers as a generic unit for application as an ABM, IBM or CBM as need arises. Thus, at each stage, it is possible to provide compression/decompression, modulation/demodulation as required, predominantly to provide a suitable interface between a standard switching environment, configured to switch full bandwidth signals, and a leased transmission environment requiring bandwidth optimisation.

As previously stated, it is undesirable repeatedly to compress and decompress signals which, ultimately, will lead to intolerable levels of information loss. In the system shown in FIG. 6, voice signals are compressed by ABMs for transmission through the network. Similarly, voice signals received from the network, are in compressed form and, as such, are decompressed by ABMs for reception by customer equipment. In this example, 64 kbit/s voice channels are compressed to 8 kbit/s (or other suitable value) voice channels for transmission over the various leased circuits.

The network shown in FIG. 6 may be used for particular applications. For example, assume the overall global network provider has been commissioned to provide a dedicated communications link for a customer having a first site in Boston, USA and a second site in Melbourne, Australia. Each site has voice, video and data facilities, and it is desired that, as far as possible, customer-specific data generated at one of the sites should be transmissible to the other sites. Such a constraint would prohibit use of public switched networks; and, in order to be given this level of functionality, the customer would be fully aware of requiring a premium service dedicated link.

At the site in Boston, the customer is provided with a voice port 94, a video port 95 and a data port 96, each of which is connected to the ABM 83. The nearest core switch facilitating international communication, is the core switch 73, based in New York. Similarly, at the Melbourne site, the customer is provided with a voice port 97, a video port 98 and a data port 99, each of which is connected to an ABM 100. A communications link 101 connects the ABM 100 to a complementary ABM 102, which is in turn connected to a remote concentrator 103. The remote concentrator 103 also communicates with complementary ABMs 104, 105 and 106, which in turn provide a service to customers distributed throughout the Melbourne area.

An IBM 107 communicates over the communications link 108 with an IBM 109. The IBM 109 facilitates communication with the core service switch 72 in Sydney. The core service switch 72 also communicates with the IBMs 110, 111 and 112, which in turn provide communications links throughout Australia.

Thus, each of the ABMs 83 and 100 is provided with a communications path to its respective core service switch 73 and 72. Communications between the core service switches 73 and 72 is provided over the international communications link 80, via the CBMs 113 and 114.

The way in which data is transmitted through the network will be described with reference to a signal being transmitted from the Melbourne site to the Boston site, although it should be appreciated that, when a communications channel is established, the communication is two-way. Therefore, in addition to signals being transmitted from Melbourne to Boston, the capability also exists for signals to be transmitted simultaneously from Boston to Melbourne.

At the Melbourne site, the ABM 100 receives voice signals from the voice port 97, video signals from the port 98 and data signals from the port 99. The voice signals supplied to the port 97 are in digital format, thereby facilitating the use of a digital switch. As is known in the art, a digital switch allocates words, making up a transmitted signal, into specific time-slots. Time switching occurs by effectively re-arranging the positions of the words between time-slots. Thus, from a transmission point of view, each transmitted signal consists of an identifiable burst of a predetermined number of bits, making up a switchable word.

In this example, it is assumed that digital voice signals are transmitted at 64 kbit/s, although it will be appreciated that alternative configurations may be used, and that an ABM would be programmed, so as to make it compatible with a customer's terminal equipment.

Figure 7:
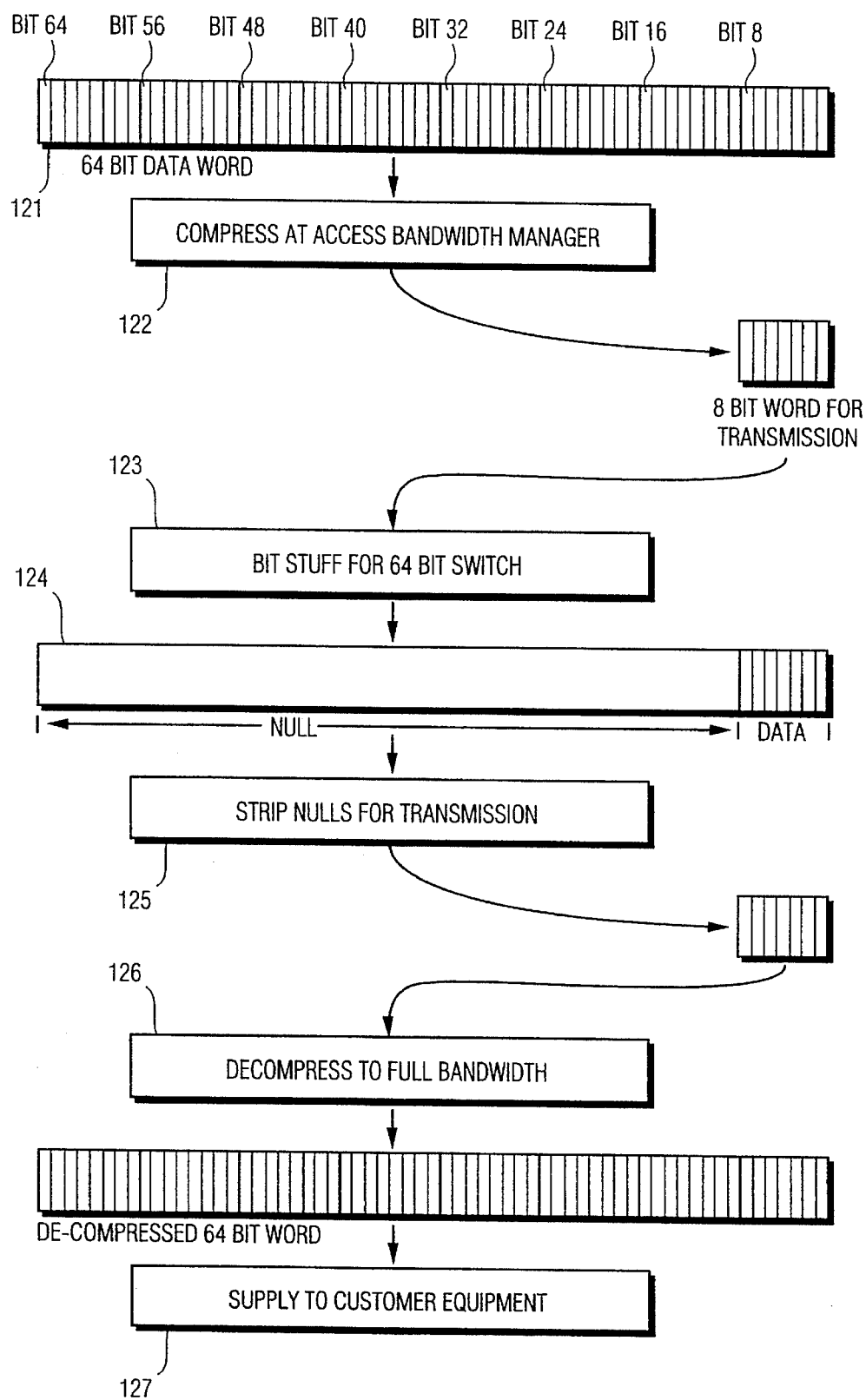
FIG. 7 illustrates the method by which compressed data is processed prior to being switched in conventional switching networks.

A 64-bit data word, made up of eight, 8-bit samples, and representing part of a digitised speech signal, is identified by reference 121 in FIG. 7. At the ABM 100, step 122 is effected to compress each 64-bit data word into an 8-bit word for transmission over the communications link 101. This level of compression is possible by exploiting the inherent redundancy present in typical speech signals using standard compression techniques, often employing a degree of predictive coding. Thus, the bandwidth required to transmit a speech signal from the ABM 100 to its complementary ABM 102 is one eighth of that required to transmit that speech signal from the voice port 97 to the ABM 100.

Signalling, to facilitate switching, is separated from the voice data, and presented to the switch as required. At the remote concentrator 103, it is necessary to include switching equipment for switching the speech channels. For example, signals may be directed from the remote concentrator 103 to other complementary ABMs, such as the ABM 104, rather than being supplied to the central core switch via the IBM 107. However, the switching equipment provided within the network is only capable of switching standard 64-bit data words, such as the word 121 shown in FIG. 7. As previously stated, it would be undesirable to decompress 8-bit data words, effect switching, and then re-compress for further transmission, given that each iteration of compression and decompression will introduce information loss, resulting in noticeable levels of signal degradation. Thus, when switching is to be effected upon a compressed voice signal, step 123 of FIG. 7 is effected, to the effect that 8-bit words are bit-stuffed to produce quasi 64-bit words, as identified by reference 124. Each quasi 64-bit word consists of eight compressed data bits, occupying the least significant bits, with the remaining 56 most significant bits set as nulls, i.e. zero or a pattern of ones and zeros representing logical zero. This 64-bit stuffed word is then switched in the same way in which a standard 64-bit word would be switched. Thereafter, at step 125, the bits stuffed into the word at the step 123 are stripped to reveal the raw 8-bit compressed word for transmission over the next stage.

Thus, the ABM 102 is arranged to bit stuff 8-bit compressed words so as to apply 64-bit words to the remote concentrator 103. At the remote concentrator 103, the quasi 64-bit words are switched; and, in this example, supplied to the IBM 107. At the IBM 107, the quasi 64-bit word is stripped, and the 8-bit words of compressed voice data are supplied to the communications link 108.

At the IBM 109, bit stuffing, identified as step 123, is repeated, so as to present quasi 64-bit words to the Sydney core switch 72. Again, switching is performed upon the quasi 64-bit words resulting, in this example, with quasi 64-bit words being supplied to the CBM 114. At the CBM 114, step 125 is effected, to strip the bit-stuffed nulls, whereafter the raw 8-bit compressed data is transmitted over the international communications link 80.

Again, at CBM 113, step 123 is repeated, resulting in quasi 64-bit words being presented to the core service switch 73 in New York. Switching is effected at the core service switch 73 upon the quasi 64-bit words, resulting in quasi 64-bit words being supplied to the IBM 93.

At the IBM 93, step 125 is repeated and the raw 8-bit compressed data is transmitted over the communications link 92. Again, at the IBM 91, step 123 is repeated, to produce quasi 64-bit words (step 124) which are switched at the remote concentrator 87, and supplied to the ABM 86.

Again, at the ABM 86, step 125 is repeated, thereby stripping the nulls, whereafter the raw 8-bit compressed words are supplied to the communications link 85.

At ABM 84, the compressed 8-bit words are received. However, at this stage, it is no longer necessary to perform the bit-stuffing operation to facilitate switching of 64-bit words. The ABM 83 is only connected to customer equipment which expects to receive voice data in non-compressed form. Thus, at the ABM 83, step 126 is effected to decompress the 8-bit words into full bandwidth 64-bit words which, at step 127, are supplied to the customer's terminal equipment via the port 94.

Thus, it should be appreciated that the algorithm to effect compression from 64-bit words to 8-bit words is effected only once, at the ABM 100. Similarly, actual decompression from 8-bit words to 64-bit words is effected only once, at the ABM 83. Throughout the network, the data has been transmitted in its compressed form, thereby minimising information loss and signal degradation. However, by the process of bit-stuffing, effected at step 123, the compressed 8-bit data is switched using conventional 64-bit switching devices.

We claim:

1. A switched telecommunications network comprising:

a first switching means for switching a first type of traffic;

a second switching means for switching a second type of traffic;

a communications link connecting a user's site to the network;

a bandwidth manager, at the user's end of the communications link, arranged to multiplex traffic of the first and second types for transmission over the link; and a complementary bandwidth manager, at the switching end of the link, arranged to de-multiplex the first and second traffic types for application to respective switching means, wherein the bandwidth manager includes means to allocate bandwidth to particular types of traffic in response to customer demand.

2. A network as in claim 1, wherein the bandwidth manager includes means for guaranteeing a minimum level of bandwidth for particular traffic types.

3. A network as in claim 1, further comprising means for multiplexing video data.

4. A network as in claim 1 including means for multiplexing computer originated data.

5. A network as in claim 1 further comprising means for multiplexing voice data or audio data.

6. A switched telecommunications network comprising:

a first switching means for switching a first type of traffic;

a second switching means for switching a second type of traffic;

a communications link connecting a user's site to the network;

a bandwidth manager, at the user's end of the communications links, arranged to multiplex traffic of the first and second types for transmission over the link;

a complementary bandwidth manager, at the switching end of the link, arranged to de-multiplex the first and second traffic types for application to respective switching means, a third switching means for switching a third type of traffic, wherein the bandwidth manager is arranged to multiplex the first, second and third types of traffic, and wherein the complementary bandwidth manager is arranged to de-multiplex the first, second and third types of traffic.

7. A switched telecommunications network comprising:

a first switching means for switching a first type of traffic;

a second switching means for switching a second type of traffic;

a communications link connecting a user's site to the network;

a bandwidth manager, at the user's end of the communications link, arranged to multiplex traffic of the first and second types for transmission over the link;

a complementary bandwidth manager, at the switching end of the link_, arranged to de-multiplex the first and second traffic types for application to respective switching means, and means for multiplexing voice data or audio data, wherein the bandwidth manager includes means for identifying voice data, and for compressing the voice data to facilitate efficient transmission through the network.

8. A switched telecommunications network comprising:

a first switching means for switching a first type of traffic;

a second switching means for switching a second type of traffic;

a communications link connecting a user's site to the network;

a bandwidth manager, at the user's end of the communications link, arranged to multiplex traffic of the first and second types for transmission over the link;

a complementary bandwidth manager, at the switching end of the link, arranged to de-multiplex the first and second traffic types for application to respective switching means, and means for multiplexing voice data or audio data, wherein the bandwidth manager includes means for identifying facsimile encoded data, and for re-coding the facsimile data to facilitate efficient transmission through the network.

9. A switched telecommunications network comprising:

a first switching means for switching a first type of traffic;

a second switching means for switching a second type of traffic;

a communications link connecting a user's site to the network;

a bandwidth manager, at the user's end of the communications link, arranged to multiplex traffic of the first and second types for transmission over the link;

a complementary bandwidth manager, at the switching end of the link, arranged to de-multiplex the first and second traffic types for application to respective switching means, and means for multiplexing voice data or audio data, wherein the bandwidth manager includes means for identifying audio encoded computer originated data from a modem, and for re-coding said data to facilitate efficient transmission.

10. A method of communicating over a network, the method comprising steps of:

switching a first type of traffic via a first switching means;

switching a second type of traffic via a second switching means;

connecting a user's site to the network via a communications link;

multiplexing traffic of the first and second types for transmission over the link at the user's end of the link;

de-multiplexing the first and second traffic types for application to respective switching means at the switching end of the link, and allocating bandwidth to particular types of traffic in response to customer demand.

11. A method as in claim 10, further comprising guaranteeing a minimum level of bandwidth for particular traffic types.

12. A method as in claim 10 wherein one of the traffic types is video data.

13. A method as in claim 10 wherein one of the said traffic types is computer originated data.

14. A method as in claim 10 wherein one of the traffic types is voice data or audio data.

15. A method of communicating over a network, the method comprising steps of:

switching a first type of traffic via a first switching means;

switching a second type of traffic via a second switching means;

connecting a user's site to the network via a communications link;

multiplexing traffic of the first and second types for transmission over the link at the user's end of the link;

de-multiplexing the first and second traffic types for application to respective switching means at the switching end of the link, and multiplexing a third traffic type.

16. A method of communicating over a network, the method comprising steps of:

switching a first type of traffic via a first switching means;

switching a second type of traffic via a second switching means;

connecting a user's site to the network via a communications link;

multiplexing traffic of the first and second types for transmission over the link at the user's end of the link;

de-multiplexing the first and second traffic types for application to respective switching means at the switching end of the link, wherein one of the traffic types is voice data or audio data, identifying voice data, and compressing the voice data to reduce transmission bandwidth requirements.

17. A method of communicating over a network, the method comprising steps of:

switching a first type of traffic via a first switching means;

switching a second type of traffic via a second switching means;

connecting a user's site to the network via a communications link;

multiplexing traffic of the first and second types for transmission over the link at the user's end of the link;

de-multiplexing the first and second traffic types for application to respective switching means at the switching end of the link, wherein one of the traffic types is voice data or audio modulated data, identifying facsimile encoded data, and re-coding said facsimile data so as to facilitate efficient transmission.

18. A method of communicating over a network, the method comprising steps of:

switching a first type of traffic via a first switching means;

switching a second type of traffic via a second switching means;

connecting a user's site to the network via a communications link;

multiplexing traffic of the first and second types for transmission over the link at the user's end of the link;

de-multiplexing the first and second traffic types for application to respective switching means at the switching end of the link, wherein one of the traffic types is voice data or audio data, identifying audio encoded computer originated data from a modem, and re-coding said data to facilitate efficient transmission.

* * * * *